US012587899B2

(12) United States Patent 
Jain

(10) Patent No.: US 12,587,899 B2 
(45) Date of Patent: Mar. 24, 2026

(54) OVERLOAD STATUS DATA TRANSMISSION TO DISTRIBUTED UNIT ENABLING OVERLOAD ACTION AT DISTRIBUTED UNIT

(71) Applicant: Dell Products, L.P., Round Rock, TX (US)

(72) Inventor: Hemant Kumar Bhawarlal Jain, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 345 days.

(21) Appl. No.: 18/313,502

(22) Filed: May 8, 2023

(65) Prior Publication Data

US 2024/0381169 A1 Nov. 14, 2024

(51) Int. Cl.
*H04W 28/02* (2009.01)

(52) U.S. Cl.
CPC ... *H04W 28/0284* (2013.01); *H04W 28/0289* (2013.01)

(58) Field of Classification Search
CPC ............. H04W 28/02; H04W 28/0284; H04W 28/0289; H04L 47/11
See application file for complete search history.

(56) References Cited

U.S. PATENT DOCUMENTS

2020/0045583 A1 2/2020 Kim et al.
2020/0229023 A1* 7/2020 Ke .................... H04W 28/0268

| | | | |
|---|---|---|---|
| 2022/0225126 A1* | 7/2022 | Ma ........................ | H04W 24/02 |
| 2023/0379987 A1* | 11/2023 | Kaasalainen ....... | H04W 28/082 |
| 2024/0314628 A1* | 9/2024 | Taneja .............. | H04W 28/0257 |
| 2024/0365321 A1* | 10/2024 | Prasad .............. | H04W 72/1273 |
| 2024/0365432 A1* | 10/2024 | Tamura ................. | H04W 76/19 |

OTHER PUBLICATIONS

International Search Report and Written Opinion received for PCT Application Serial No. PCT/US2023/036177 dated Feb. 6, 2024, 16 pages.
NTT Docomo, "High-level Overview of Load Management", 3GPP TSG-RAN WG3 #104, R3-192508, May 13-17, 2019, 6 pages.
International Preliminary Report on Patentability received for PCT Application Serial No. PCT/US2023/036177 dated Nov. 20, 2025, 9 pages.

* cited by examiner

*Primary Examiner* — Asad M Nawaz
*Assistant Examiner* — Najeeb Ansari
(74) *Attorney, Agent, or Firm* — Amin, Turocy & Watson, LLP

(57) ABSTRACT

Overload status data transmission to a distributed unit, enabling overload action at distributed unit (e.g., using a computerized tool), is enabled. For example, a system can comprise: a processor and a memory that stores executable instructions that, when executed by the processor, facilitate performance of operations, comprising: determining an overload state of a centralized unit user plane of network equipment, and transmitting overload status data, representative of the overload state of the centralized unit user plane, to a distributed unit of the network equipment.

20 Claims, 10 Drawing Sheets

702 ---- DETERMINING AN OVERLOAD STATE OF A CENTRALIZED UNIT USER PLANE OF NETWORK EQUIPMENT

704 ---- TRANSMITTING OVERLOAD STATUS DATA, REPRESENTATIVE OF THE OVERLOAD STATE OF THE CENTRALIZED UNIT USER PLANE, TO A DISTRIBUTED UNIT OF THE NETWORK EQUIPMENT

300

| Bits | | | | | | | | Number of Octets |
|---|---|---|---|---|---|---|---|---|
| 7 | 6 | 5 | 4 | 3 | 2 | 1 | 0 | |
| PDU Type (=0) | | | Spare | | DL Discard Blocks | DL Flush | Report Polling | 1 |
| Spare 302 | | | Request OutOfSeq Report | Report Delivered | User Data Existance Flag | Assistance Info Report Polling Flag | Retransmission Flag | 1 |
| NR-U Sequence Number | | | | | | | | 3 |
| DL Discard NR PDCP PDU SN | | | | | | | | 0 or 3 |
| DL Discard Number of Blocks | | | | | | | | 0 or 1 |
| DL Discard NR PDCP PDU SN Start (First Block) | | | | | | | | 0 or 3 |
| Discarded Block Size (First Block) | | | | | | | | 0 or 1 |
| ... | | | | | | | | |
| DL Discard NR PDCP PDU SN Start (Last Block) | | | | | | | | 0 or 3 |
| Discarded Block Size (Last Block) | | | | | | | | 0 or 1 |
| DL Report NR PDCP PDU SN | | | | | | | | 0 or 3 |
| Padding | | | | | | | | 0-3 |

| 7 | 6 | 5 | 4 | 3 | 2 | 1 | 0 | Number of Octets |
|---|---|---|---|---|---|---|---|---|
| PDU Type (=0) | | | | Spare | DL Discard Blocks | DL Flush | Report Polling | 1 |
| Spare 402 | | Overload State 404 | Request OutOfSeq Report | Report Delivered | User Data Existance Flag | Assistance Info Report Polling Flag | Retransmission Flag | 1 |
| NR-U Sequence Number | | | | | | | | 3 |
| DL Discard NR PDCP PDU SN | | | | | | | | 0 or 3 |
| DL Discard Number of Blocks | | | | | | | | 0 or 1 |
| DL Discard NR PDCP PDU SN Start (First Block) | | | | | | | | 0 or 3 |
| Discarded Block Size (First Block) | | | | | | | | 0 or 1 |
| ... | | | | | | | | |
| DL Discard NR PDCP PDU SN Start (Last Block) | | | | | | | | 0 or 3 |
| Discarded Block Size (Last Block) | | | | | | | | 0 or 1 |
| DL Report NR PDCP PDU SN | | | | | | | | 0 or 3 |
| Padding | | | | | | | | 0-3 |

| IE/Group Name | Presence | Range | IE Type and Reference | Semantics Description | Criticality | Assigned Criticality |
|---|---|---|---|---|---|---|
| Message Type | M | | 9.3.1.1 | | YES | Reject |
| Transaction ID | M | | 9.3.1.23 | | YES | Reject |
| Overload State | M | | ENUMERATED (Overloaded, Not-Overloaded) | | YES | Ignore |
| Impacted UE List | | 1 | | | - | |
| >UE-List | | 1.. <maxNumOfUEUnderOverload> | | | EACH | Reject |
| >> gNB-CU UE F1AP ID | M | | 9.3.1.4 | | - | |
| >> gNB-DU UE F1AP ID | M | | 9.3.1.5 | | - | |
| >> Impacted DRB List | M | 1 | | | | |
| >> DRB List | | 1.. <MaxNoOfDRBs> | | | EACH | Reject |
| >> DRB ID | M | | 9.3.1.8 | | - | |

DETERMINING AN OVERLOAD STATE OF A CENTRALIZED UNIT USER PLANE OF NETWORK EQUIPMENT

704

TRANSMITTING OVERLOAD STATUS DATA, REPRESENTATIVE OF THE OVERLOAD STATE OF THE CENTRALIZED UNIT USER PLANE, TO A DISTRIBUTED UNIT OF THE NETWORK EQUIPMENT

800

802 ⸺ DETERMINING, BY NETWORK EQUIPMENT COMPRISING A PROCESSOR, AN OVERLOAD STATE OF A CENTRALIZED UNIT USER PLANE OF THE NETWORK EQUIPMENT

804 ⸺ TRANSMITTING, BY THE NETWORK EQUIPMENT TO A DISTRIBUTED UNIT OF THE NETWORK EQUIPMENT, OVERLOAD STATUS DATA REPRESENTATIVE OF THE OVERLOAD STATE OF THE CENTRALIZED UNIT USER PLANE

OVERLOAD STATUS DATA TRANSMISSION TO DISTRIBUTED UNIT ENABLING OVERLOAD ACTION AT DISTRIBUTED UNIT

BACKGROUND

With each new generation of cellular networks, mobile connectivity becomes increasingly ubiquitous. More and more devices are becoming internet connected, and cellular network bandwidths continue to increase to accommodate the increased demand. However, network constraints still exist, and in some locations, or at certain times, cellular networks can still become overloaded, leading to poor performance for connected devices.

Overload control strategy is a key design aspect for a wireless network. Without corresponding control, a network operator would have to overprovision the network, leading elevated operating costs. Overload control strategies are also needed in a radio access network, for instance, to promote efficient usage of available resources. In existing systems, when a gNB-CU-UP detects an overload, it can take action to mitigate the overload or to communicate the overload status to a gNB-CU-CP. In order for the gNB-CU-UP to mitigate the overload, the gNB-CU-UP can discard downlink packets (e.g., SDAP SDU) coming from a next generation (NG) user plane interface (e.g., NG-U) or discard uplink packets (PDCP PDU, NR-U DDDS) coming from a gNB-DU, for instance, via F1-U. Upon notification of gNB-CU-UP overload, a gNB-CU-CP could trigger overload action, such as preventing allocation of a new user equipment (UE) or data radio bearer (DRB) to the overloaded gNB-CU-UP, or triggering load balancing to move the UE or DRB from the overloaded gNB-CU-UP to another gNB-CU-UP. When a gNB-CU-CP initiates a gNB-CU-UP change for the UE on the overload gNB-CU-UP, signaling across multiple nodes can occur, and such signaling has to occur per UE. This procedure can last several seconds, and uplink (UL) and downlink (DL) packets are often discarded during this time. Discarding of UL packets can lead to, for instance, waste of air interface radio resources.

The above-described background relating to telecommunications is merely intended to provide a contextual overview of some current issues and is not intended to be exhaustive. Other contextual information may become further apparent upon review of the following detailed description.

BRIEF DESCRIPTION OF DRAWINGS

FIG. 3 is a diagram of a packet data unit in accordance with one or more embodiments described herein.

FIG. 4 is a diagram of a packet data unit in accordance with one or more embodiments described herein.

FIG. 5 is a diagram of an F1 Application Protocol message in accordance with one or more embodiments described herein.

DETAILED DESCRIPTION

Figure 1:
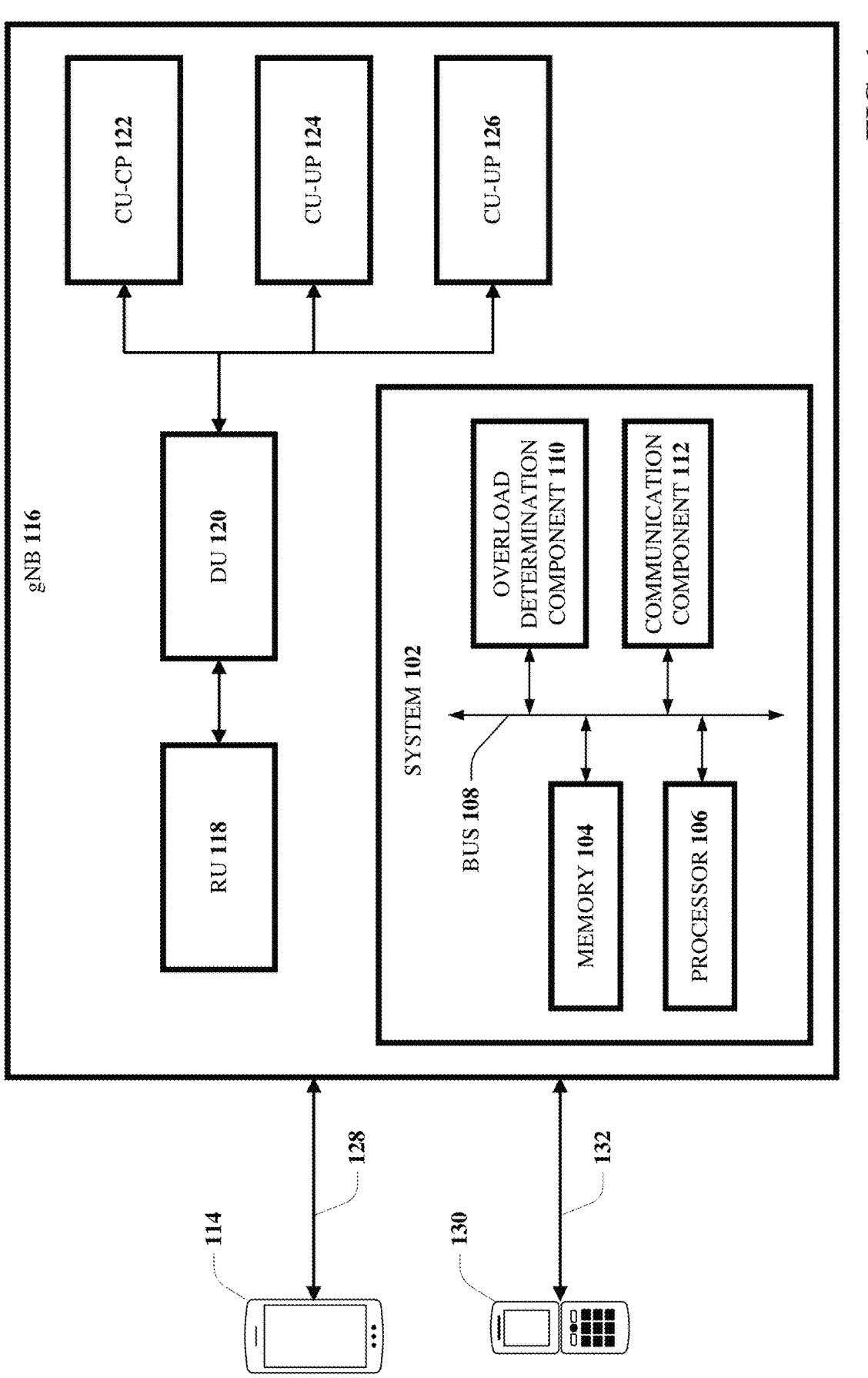
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, overload status data transmission (e.g., for a cellular network) can be improved in various ways, and various embodiments are described herein to this end and/or other ends. In this regard, the disclosed subject matter relates to telecommunications and, more particularly, to overload status data transmission to a distributed unit of a network.

According to an embodiment, a system can comprise a processor, and a memory that stores executable instructions that, when executed by the processor, facilitate performance of operations, comprising: determining an overload state of a centralized unit user plane of network equipment, and transmitting overload status data, representative of the overload state of the centralized unit user plane, to a distributed unit of the network equipment.

In one or more embodiments, the overload status data can comprise new radio user plane protocol data transmitted in accordance with a new radio user plane communication protocol. In some implementations, the overload status data can be represented in a spare bit of the new radio user plane protocol data. In other embodiments, the overload status data can comprise F1 application protocol data transmitted in accordance with an F1 control plane protocol. In various embodiments, the overload status data can be indicative of an overloaded data radio bearer applicable to the distributed unit.

In one or more embodiments, transmitting the overload status data to the distributed unit can cause the distributed unit to execute an overload operation to mitigate the overload state of the centralized unit user plane. It is noted that, in various implementations, the overload operation can comprise a deprioritization, according to a defined deprioritization criterion, of a user equipment or a data radio bearer associated with the overload state of the centralized unit user plane.

In some embodiments, the distributed unit of the network equipment can stop scheduling data transmission, for an overloaded data radio bearer, via a network applicable to the network equipment until the overload state has been determined to have ended. It is noted that the distributed unit of the network equipment can resume the scheduling of the data transmission, for the overloaded data radio bearer, via the network after the overload state has been determined to have ended.

In another embodiment, a non-transitory machine-readable medium can comprise executable instructions that, when executed by a processor, facilitate performance of operations, comprising: determining an overload state of a centralized unit user plane of network equipment, and transmitting overload status data, representative of the overload state of the centralized unit user plane, to a distributed unit of the network equipment.

In various embodiments, the overload status data can comprise new radio user plane protocol data transmitted in accordance with a new radio user plane communication protocol. It is noted that the overload status data can be represented in a spare bit of the new radio user plane protocol data. In other embodiments, the overload status data can comprise F1 application protocol data. In this regard, the F1 application protocol data can be transmitted according to an F1 control plane protocol.

In some embodiments, transmitting the overload status data to the distributed unit can cause the distributed unit to execute an overload operation to decrease a load associated with the overload state of the centralized unit user plane.

According to yet another embodiment, a method can comprise: determining, by network equipment comprising a processor, an overload state of a centralized unit user plane of the network equipment, and transmitting, by the network equipment to a distributed unit of the network equipment, overload status data representative of the overload state of the centralized unit user plane.

In various embodiments, transmitting the overload status data can cause the distributed unit to execute an overload operation configured to mitigate the overload state of the centralized unit user plane. In this regard, the overload operation can comprise a deprioritization, according to a defined deprioritization criterion, of a mobile device or a data radio bearer associated with the overload state of the centralized unit user plane.

In one or more embodiments, the distributed unit of the network equipment can stop scheduling data transmission, for an overloaded data radio bearer, via a network applicable to the network equipment until the overload state has ended. In this regard, the distributed unit of the network equipment can resume the scheduling of the data transmission, for the overloaded data radio bearer, via the network after the overload state has ended.

It should be appreciated that additional manifestations, configurations, implementations, protocols, etc. can be utilized in connection with the following components described herein or different/additional components as would be appreciated by one skilled in the art.

Embodiments herein can facilitate, for instance, data transmission to a gNB-DU regarding an overload state of CU-UPs. The foregoing can enable the gNB-DU to minimize or even eliminate wasted processing resources or packet transfer. An overload mitigation action by the gNB-DU is faster than a different component of a gNB because, for instance, the gNB-DU facilitates scheduling of uplink resources for the gNB. It is thus noted that, if a gNB-DU receives an indication regarding an overload of a gNB-CU-UP, waste of air interface resources can be minimized or even avoided entirely. Therefore, embodiments herein enable mechanism(s) to inform a gNB-DU of an overload state of a gNB-CU-UP. When a gNB-DU receives an indication regarding a particular UE or DRB associated with overload of the gNB-CU-UP, the gNB-DU can, for instance, buffer the UL packet data convergence protocol (PDCP) PDU for a defined duration, or can deprioritize such UE from UL and DL scheduling.

Turning now to FIG. 1, there is illustrated an example, non-limiting system 102 in accordance with one or more embodiments herein. System 102 can comprise a computerized tool, which can be configured to perform various operations relating to overload status data transmission. The system 102 can comprise one or more of a variety of components, such as memory 104, processor 106, bus 108, overload determination component 110 and/or communication component 112. In various embodiments, a gNodeB (gNB) 116 can comprise the system 102. The gNB 116 can additionally, or alternatively, comprise a radio unit (RU) 118, gNB-DU (distributed unit) 120 (e.g., DU 120), gNB-CU-CP 122 (e.g., CU-CP 122), gNB-CU-UP 124 (e.g., CU-UP 124), gNB-CU-UP 126 (e.g., CU-UP 126). In some embodiments, one or more of the radio unit (RU) 118, gNB-DU (distributed unit) 120 (e.g., DU 120), gNB-CU-CP 122 (e.g., CU-CP 122), gNB-CU-UP 124 (e.g., CU-UP 124), gNB-CU-UP 126 (e.g., CU-UP 126) can be located externally to the gNB 116. In various embodiments, the gNB 116 can be communicatively coupled to, or can further comprise, mobile device 114 (e.g., a UE) and/or mobile device 130 (e.g., a UE). It is noted that the mobile device 114 can be communicatively coupled to the gNB 116 via a bearer 128 (e.g., a DRB), and the mobile device 130 can be communicatively coupled to the gNB 116 via a bearer 132 (e.g., a DRB). In various embodiments, one or more of the memory 104, processor 106, bus 108, overload determination component 110, communication component 112, mobile device 114, gNB 116, RU 118, DU 120, CU-CP 122, CU-UP 124, CU-UP 126, and/or mobile device 130 can be communicatively or operably coupled (e.g., over a bus or wireless network) to one another to perform one or more functions of the system 102 or gNB 116.

According to an embodiment, the overload determination component 110 can determine an overload state of a centralized unit user plane (e.g., CU-UP 124 or CU-UP 126) of network equipment (e.g., gNB 116). In various embodiments, such an overload state can be associated with processing capacity (e.g., processing demand exceeding processing capability) applicable to the corresponding CU-UP, packet flow (e.g., packet flow exceeding packet flow processing capability) applicable to the corresponding CU-UP, or based on another suitable metric. It is noted that such packets (e.g., of the packet flow) can comprise data packets or control packets.

According to an embodiment, the communication component 112 can transmit overload status data, representative of the overload state of the centralized unit user plane (e.g., CU-UP 124 or CU-UP 126), to a distributed unit (e.g., DU 120) of the network equipment (e.g., gNB 116).

In some embodiments, such overload status data can comprise new radio user plane (NR-UP) protocol data transmitted in accordance with a new radio user plane communication protocol. It is noted that such a NR-UP protocol can comprise a communication protocol used between a DU (e.g., DU 120) and CU-UP (e.g., CU-UP 124 or CU-UP 126). FIG. 3 illustrates corresponding new radio user plane protocol data 300. For example, such new radio user plane protocol data 300 can comprise spare bits 302 (e.g., Bit-3 of Octet 1, Bit-5 of Octet 2, Bit-6 of Octet 2, Bit-7 of Octet 2, and/or another suitable spare bit). In this regard, the overload status data can be represented in one or more of the spare bits of the new radio user plane protocol data.

FIG. 4 illustrates corresponding new radio user plane protocol data 400 in which a spare bit (e.g., Bit-5 of Octet 2) of the spare bits 402 is utilized for overload state data (e.g., overload state data 404). It is noted that the spare bit utilized is not limited to the configuration illustrated in FIG. 4—such a configuration is exemplary, and it is noted that other bit locations can be utilized in order to indicate the overload state of a gNB-CU-UP herein. According to an embodiment, the overload state data 404 can comprise the following:

5.5.3.x Overload State

Description: This parameter indicates the overload state of the gNB-CU-UP instance associated with the DRB Value range: (0=Not Overloaded; 1=Overloaded).

Field length: 1 bit.

In other embodiments, overload status data (e.g., regarding an overload state of a gNB-CU-UP) can comprise F1 application protocol (F1AP) data transmitted in accordance with an F1 control plane protocol (e.g., F1-C). In this regard, awareness by the gNB-CU-CP of an overload state of a gNB-CU-UP can be leveraged, for instance, in order to communicate the overload state to the gNB-DU. It is noted that the F1 control plane protocol can be utilized for signaling between the CU-CP and the DU. FIG. 5 illustrates an exemplary F1AP message 500, which can be utilized to transmit overload status data from a gNB-CU-CP to a gNB-DU, for instance, over F1-C. The message 500 can comprise an indication or list of DRBs that are associated with the overloaded gNB (e.g., according to respective DRB identifiers). In various embodiments, message 500 can be sent by a gNB-CU-CP to indicate to a gNB-DU a particular DRB (e.g., bearer 128) associated with the overloaded gNB-CU-UP. In message 500, Message Type can indicate the type of message (e.g., whether containing a CU-CP status indication), Transaction ID can indicate a corresponding transaction (e.g., according to an application protocol), Overload State can indicate whether or not the corresponding gNB is overloaded, and Impacted UE List can indicate UEs impacted by the overload state.

It is noted that, in various embodiments UEs can be associated with different CU-UPs herein. Because a given UE (e.g., mobile device 114, mobile device 130, or another suitable mobile device) can comprise multiple DRBs (e.g., DRB 128, DRB 132, or another DRB), the DRBs impacted by the overload state can additionally, or alternatively, be indicated in the message 500. For example, a gNB (e.g., gNB 116) can comprise two CU-UPs (e.g., CU-UP 124 and CU-UP 126), and a UE can comprise a first DRB applicable to a first CU-UP and a second DRB applicable to a second CU-UP. In this regard, along with the UE, the message 500 can indicate which DRB applicable to the overloaded gNB. For example, a UE1 (e.g., mobile device 114) can comprise DRB1 and DRB2. DRB1 can be applicable to CU-UP1 (e.g., CU-UP 124), and DRB2 can be applicable to CU-UP2 (e.g., CU-UP 126). If only CU-UP1 is overloaded, then the message 500 can comprise an indication of only CU-UP1 and DRB1. The DU 120 can then be enabled to facilitate an overload mitigation action for DRB1 only (not DRB 2). In this regard, it is noted that such overload status data can be indicative of an overloaded data radio bearer (e.g., bearer 128, bearer 132, or another DRB) applicable to the distributed unit (e.g., DU 120).

In various embodiments, transmitting the overload status data to the distributed unit (e.g., DU) can cause the DU to execute an overload operation to mitigate the overload state of the centralized unit user plane (e.g., CU-UP). Though overload actions can vary, for instance, depending on implementation, an exemplary overload operation can comprise a deprioritization, according to a defined deprioritization criterion, of a user equipment or a data radio bearer associated with the overload state of the centralized unit user plane. Such a defined prioritization criterion can be configured, for instance, according to a 5Q1 or QCI applicable to a given UE, bearer, or packet flow.

In one or more embodiments, the distributed unit (e.g., DU 120) of the network equipment (e.g., gNB 116) of a network (e.g., a cellular network) can stop scheduling data transmission, for an overloaded data radio bearer (e.g., DRB 128 or DRB 132), via a network (e.g., the cellular network—not depicted) applicable to the network equipment (e.g., gNB 116) until the overload state has been determined (e.g., via the overload determination component 110) to have ended. In this regard, the distributed unit (e.g., DU 120) of the network equipment can resume the scheduling of the data transmission, for the overloaded data radio bearer, via the network (e.g., the cellular network) after the overload state has been determined (e.g., via the overload determination component 110) to have ended.

It is noted that the communication component 112 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 2:
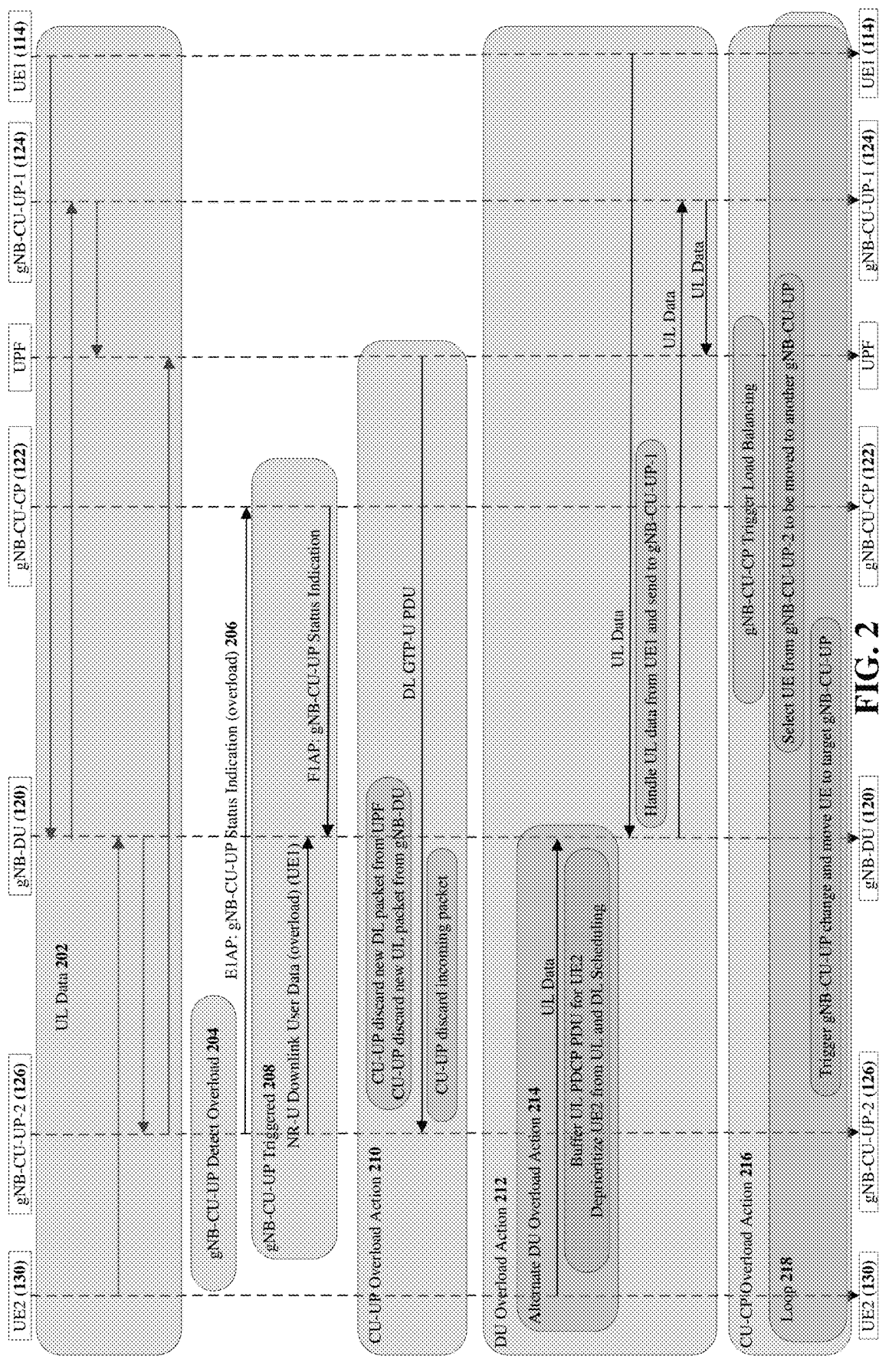
FIG. 2 is a diagram of an exemplary process flow in accordance with one or more embodiments described herein.

Turning now to FIG. 2, there is illustrated a diagram of an exemplary process flow in accordance with one or more embodiments described herein. According to an embodiment, at 202, UL data can be transmitted via the depicted flows. For instance, UL data can be transmitted from UE1 (e.g., mobile device 114) to gNB-DU (e.g., DU 120), from DU 120 to gNB-CU-UP-1 (e.g., CU-UP 124), from CU-UP 124 to user plane function (UPF), from UE2 (e.g., mobile device 130) to DU 120, from DU 120 to gNB-CU-UP-2 (e.g., CU-UP 126), from CU-UP 126 to UPF, and/or otherwise transmitted. At 204, an overload can be detected (e.g., via overload determination component 110) of a system 102 and/or CU-UP herein. At 206, an E1AP (e.g., E1 application protocol) can be utilized (e.g., via the system 102) for a gNB-CU-UP Status Indication (e.g., indicating an overload state). At 208, the gNB-CU-UP (e.g., CU-UP 126) can be triggered, which can comprise transmission of NR-U Downlink User Data (e.g., indicating overload for UE1) from CU-UP 126 to DU 120, and/or can comprise utilization of F1AP for gNB-CU-UP Status Indication. At 210, a CU-UP overload action can be conducted, in which the CU-UP (e.g., CU-UP 124 and/or CU-UP 126) discards new DL packet(s) from UPF and/or the CU-UP discards new UL packet from the gNB-DU (e.g., DU 120). DL general packet radio service tunnelling protocol user (GTP-U) packet data unit (PDU) can be transmitted from the UPF to a CU-UP herein, and/or the CU-UP can discard one or more incoming packets. At 212, DU overload action can be performed. For instance, an alternate DU overload action 214 can comprise transmission of corresponding UL data from a mobile device 130 to the DU 120, buffering UL PDCP PDU for the mobile device 130, and/or deprioritizing the mobile device 130 from UL and DL scheduling. The DU overload action 212 can comprise transmission of UL data from the mobile device 114 to the DU 120, which can carry UL data from mobile device 114 and send it to gNB-CU-UP 124. Additionally, the UL data can be transmitted from the gNB-CU-UP 124 to the UPF. At 216, a CU-CP overload action can be performed. For example, the gNB-CU-CP can trigger load balancing. During loop 218, the CU-CP 122 can select a mobile device a gNB-CU-UP to be moved to another gNB-CU-UP. Additionally, the DU 120 can trigger a gNB-CU-UP change and move a UE to a target gNB-CU-UP. In other embodiments, if the CU-UP is in overload, the CU-UP can stop locating new bearers or new UEs to that CU-CP. In this regard, when the CU-CP receives a notification that a CU-UP is over- loaded, and if there exists a new incoming UE, the CU-CP can move the UE to a new different CU-UP. In this regard, a given CU-CP can be associated with a plurality of CU-UPs.

Figure 6:
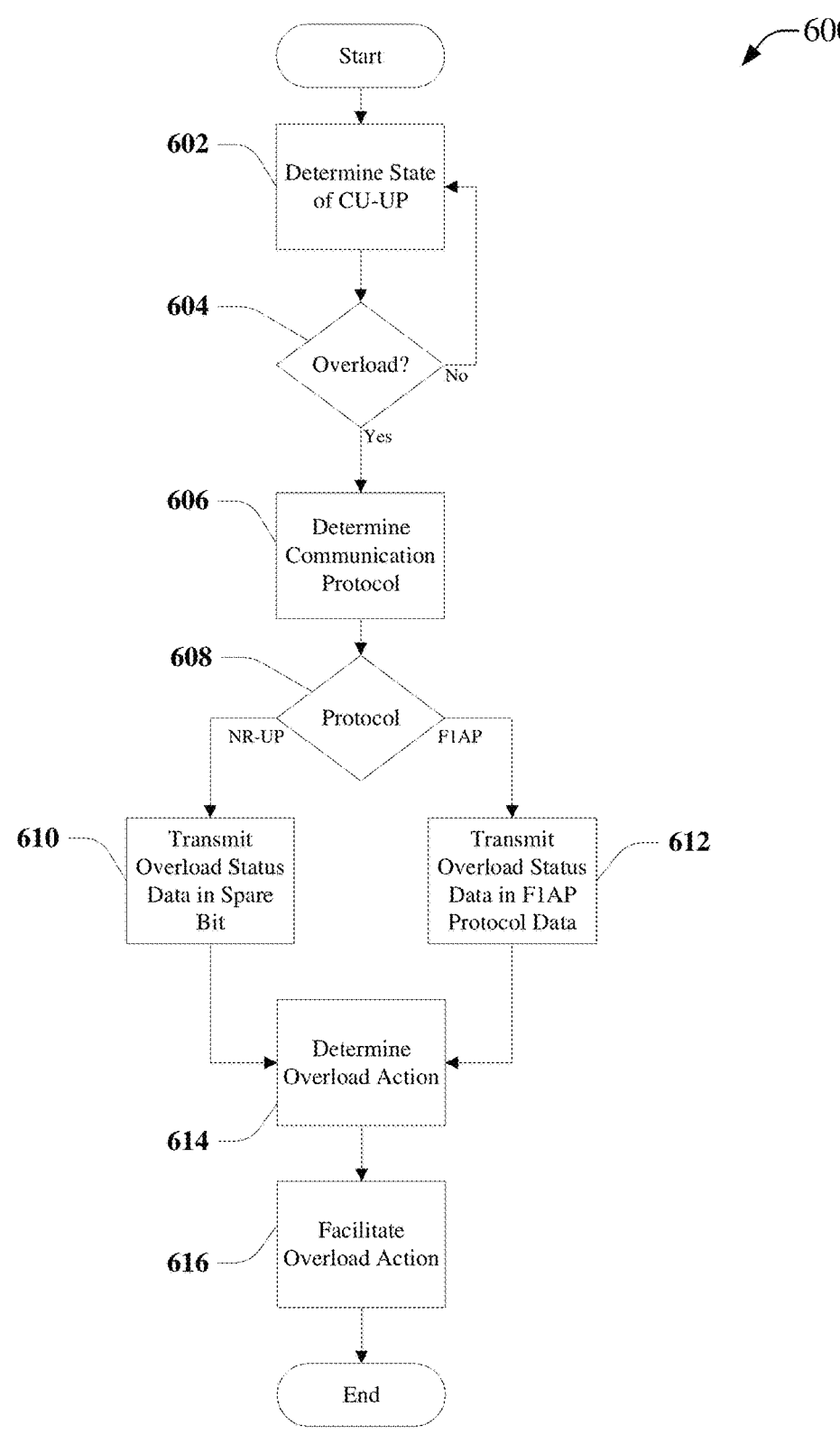
FIG. 6 is a flowchart for a process associated with overload status data transmission in accordance with one or more embodiments described herein.

Turning now to FIG. 6, there is illustrated a flowchart of a process 600 relating to overload status data transmission in accordance with one or more embodiments described herein. At 602, a state of the CU-UP (e.g., CU-UP 124) can be determined (e.g., via the overload determination component 110). At 604, if the CU-UP is overloaded, the process can proceed to 606. Otherwise, the process can return to 602. At 606, a communication protocol can be determined (e.g., via the overload determination component 110). For instance, the overload state can be transmitted (e.g., via the communication component 112) in accordance with an F1 control plane protocol, a new radio user plane communication protocol, or another suitable protocol. Such a determination can be determined based on one or more defined gNB 116 settings, or otherwise determined according to a suitable criterion. If the overload state is to be transmitted according to a new radio user plane communication protocol, the process can proceed to 610 at which the overloaded status is transmitted in a spare bit of new radio user plane protocol data. Or, if the overload state is to be transmitted according to the F1 control plane protocol, the process can proceed to 612 at which the overload status is transmitted in F1 control plane protocol data. At 614, an overload action can be determined (e.g., via the overload determination component 110). At 616, the overload action can be facilitated (e.g., via the overload determination component 110, communication component 112, via the gNB 116, or via another suitable or applicable device, system, or component).

Figure 7:
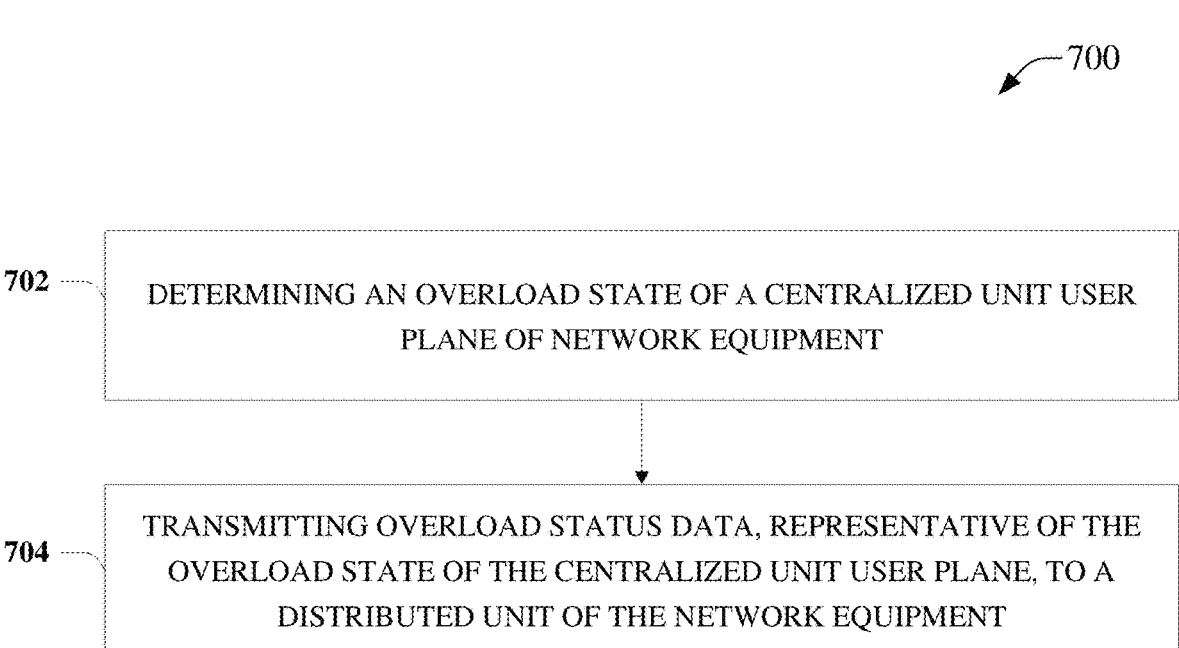
FIG. 7 is a block flow diagram for a process associated with overload status data transmission in accordance with one or more embodiments described herein.

FIG. 7 illustrates a block flow diagram for a process 700 associated with overload status data transmission in accordance with one or more embodiments described herein. At 702, the process 700 can comprise determining (e.g., via the overload determination component 110) an overload state of a centralized unit user plane (e.g., CU-CP 122) of network equipment (e.g., gNB 116). At 704, the process 700 can comprise transmitting (e.g., via the communication component 112) overload status data, representative of the overload state of the centralized unit user plane, to a distributed unit (e.g., DU 120) of the network equipment (e.g., gNB 116).

Figure 8:
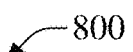
FIG. 8 is a block flow diagram for a process associated with overload status data transmission in accordance with one or more embodiments described herein.

FIG. 8 illustrates a block flow diagram for a process 800 associated with overload status data transmission in accordance with one or more embodiments described herein. At 802, the process 800 can comprise determining, by network equipment comprising a processor (e.g., via the overload determination component 110), an overload state of a centralized unit user plane (e.g., CU-CP 122) of the network equipment (e.g., gNB 116). At 804, the process 800 can comprise transmitting, by the network equipment to a distributed unit (e.g., DU 120) of the network equipment (e.g., via the communication component 112), overload status data representative of the overload state of the centralized unit user plane.

Figure 9:
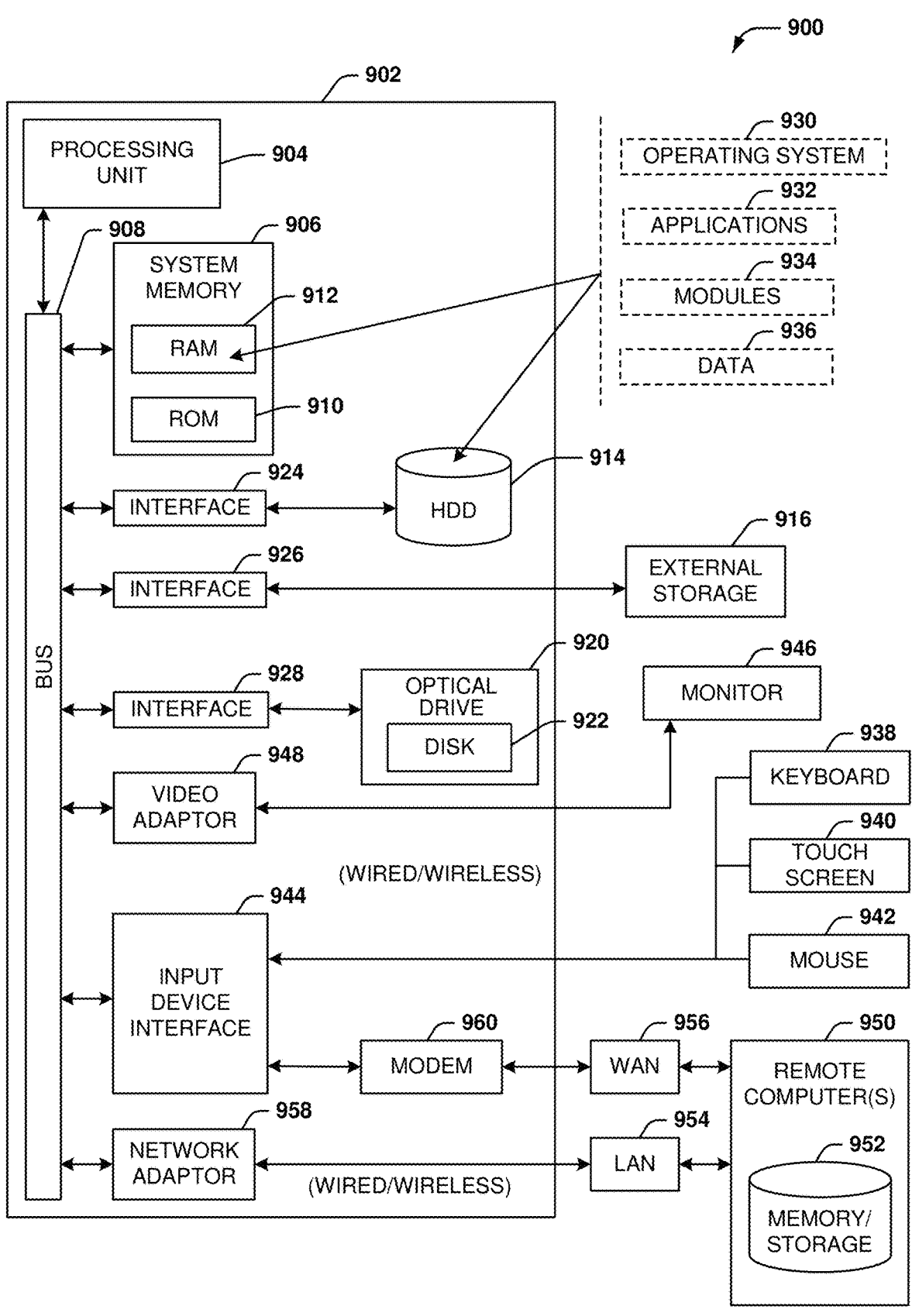
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
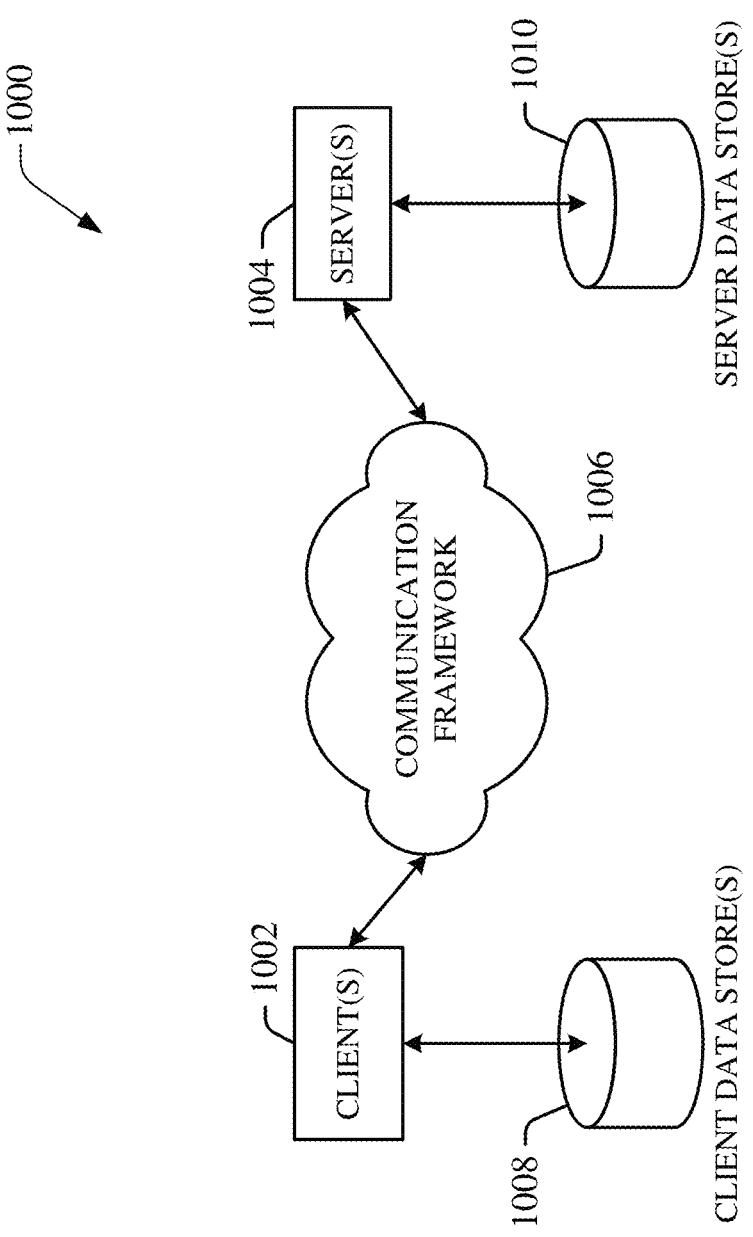
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one processor; and
at least one memory that stores executable instructions that, when executed by the at least one processor, facilitate performance of operations, comprising:
determining an overload state of a first centralized unit user plane of network equipment; and
transmitting overload status data, representative of the overload state of the first centralized unit user plane, to a distributed unit of the network equipment,
wherein transmitting the overload status data causes the distributed unit to execute an overload operation configured to mitigate the overload state of the first centralized unit user plane,
wherein the overload operation comprises a deprioritization, according to a defined deprioritization criterion, of a first data radio bearer of a mobile device associated with the overload state of the first centralized unit user plane, wherein the overload operation is not applied to a second data radio bearer of the mobile device associated with a second centralized unit user plane, other than the first centralized unit user plane,
wherein the overload status data comprises new radio user plane protocol data transmitted in accordance with a new radio user plane communication protocol,
wherein the overload status data is represented in a spare bit of the new radio user plane protocol data, and
wherein the spare bit comprises bit-3 of octet 1, bit-5 of octet 2, bit-6 of octet 2, or bit-7 of octet 2 of the new radio user plane protocol data.

2. The system of claim 1, wherein the overload status data further comprises F1 application protocol data.

3. The system of claim 1, wherein the distributed unit of the network equipment stops scheduling data transmission, for an overloaded data radio bearer, via a network applicable to the network equipment until the overload state has been determined to have ended.

4. The system of claim 3, wherein the distributed unit of the network equipment resumes the scheduling of the data transmission, for the overloaded data radio bearer, via the network after the overload state has been determined to have ended.

5. The system of claim 1, wherein the overload state comprises a value of 0 when not overloaded or a value of 1 when overloaded.

6. The system of claim 1, wherein the deprioritization is performed according to a defined 5QI protocol.

7. The system of claim 2, wherein the F1 application protocol data is transmitted according to an F1 control plane protocol.

8. A non-transitory machine-readable medium, comprising executable instructions that, when executed by at least one processor, facilitate performance of operations, comprising:
determining an overload state of a first centralized unit user plane of network equipment; and
transmitting overload status data, representative of the overload state of the first centralized unit user plane, to a distributed unit of the network equipment,
wherein transmitting the overload status data causes the distributed unit to execute an overload operation configured to mitigate the overload state of the first centralized unit user plane,
wherein the overload operation comprises a deprioritization, according to a defined deprioritization criterion, of a first data radio bearer of a mobile device associated with the overload state of the first centralized unit user plane,
wherein the overload operation is not applied to a second data radio bearer of the mobile device associated with a second centralized unit user plane, other than the first centralized unit user plane,
wherein the overload status data comprises new radio user plane protocol data transmitted in accordance with a new radio user plane communication protocol,
wherein the overload status data is represented in a spare bit of the new radio user plane protocol data, and
wherein the spare bit comprises bit-3 of octet 1, bit-5 of octet 2, bit-6 of octet 2, or bit-7 of octet 2 of the new radio user plane protocol data.

9. The non-transitory machine-readable medium of claim 8, wherein the overload status data further comprises F1 application protocol data.

10. The non-transitory machine-readable medium of claim 9, wherein the F1 application protocol data is transmitted according to an F1 control plane protocol.

11. The non-transitory machine-readable medium of claim 9, wherein the distributed unit of the network equipment stops scheduling data transmission, for an overloaded data radio bearer, via a network applicable to the network equipment until the overload state has ended.

12. The non-transitory machine-readable medium of claim 11, wherein the distributed unit of the network equipment resumes the scheduling of the data transmission, for the overloaded data radio bearer, via the network after the overload state has ended.

13. The non-transitory machine-readable medium of claim 9, wherein the overload state comprises a value of 0 when not overloaded or a value of 1 when overloaded.

14. A method, comprising:

determining, by network equipment comprising at least one processor, an overload state of a first centralized unit user plane of the network equipment; and transmitting, by the network equipment to a distributed unit of the network equipment, overload status data representative of the overload state of the first centralized unit user plane, wherein transmitting the overload status data causes the distributed unit to execute an overload operation configured to mitigate the overload state of the first centralized unit user plane, wherein the overload operation comprises a deprioritization, according to a defined deprioritization criterion, of a first data radio bearer of a mobile device associated with the overload state of the first centralized unit user plane, wherein the overload operation is not applied to a second data radio bearer of the mobile device associated with a second centralized unit user plane, other than the first centralized unit user plane, wherein the overload status data comprises new radio user plane protocol data transmitted in accordance with a new radio user plane communication protocol, wherein the overload status data is represented in a spare bit of the new radio user plane protocol data, and wherein the spare bit comprises bit-3 of octet 1, bit-5 of octet 2, bit-6 of octet 2, or bit-7 of octet 2 of the new radio user plane protocol data.

15. The method of claim 14, wherein the distributed unit of the network equipment stops scheduling data transmission, for an overloaded data radio bearer, via a network applicable to the network equipment until the overload state has ended.

16. The method of claim 15, wherein the distributed unit of the network equipment resumes the scheduling of the data transmission, for the overloaded data radio bearer, via the network after the overload state has ended.

17. The non-transitory machine-readable medium of claim 9, wherein the deprioritization is performed according to a defined 5QI protocol.

18. The method of claim 14, wherein the overload status data further comprises F1 application protocol data.

19. The method of claim 18, wherein the F1 application protocol data is transmitted according to an F1 control plane protocol.

20. The method of claim 14, wherein the overload state comprises a value of 0 when not overloaded or a value of 1 when overloaded.

* * * * *